Sept. 5, 1967     J. D. GORDON     3,339,934
SEALING GROMMET

Filed Feb. 23, 1965     2 Sheets-Sheet 1

FIG.I

INVENTOR
Julian D. Gordon
BY
Wolf, Greenfield & Hieken
ATTORNEYS

Sept. 5, 1967     J. D. GORDON     3,339,934
SEALING GROMMET

Filed Feb. 23, 1965     2 Sheets-Sheet 2

INVENTOR
Julian D. Gordon
BY Wolf, Greenfield & Hieken
ATTORNEYS

United States Patent Office 3,339,934
Patented Sept. 5, 1967

3,339,934
SEALING GROMMET
Julian D. Gordon, Peabody, Mass., assignor to Jet Spray Cooler, Inc., Waltham, Mass., a corporation of Massachusetts
Filed Feb. 23, 1965, Ser. No. 434,306
4 Claims. (Cl. 277—205)

ABSTRACT OF THE DISCLOSURE

A beverage dispenser having a bowl with an opening in its bottom wall surrounded by a downwardly open channel which releasable carries the body of a grommet having an inwardly extending flange that is bent upwardly against the outer surface of a cold dome that extends into the bowl through the opening.

---

This invention relates to beverage dispensers of the type having a removable bowl with an opening in the bottom through which a refrigerating element extends to cool the beverage in the bowl, and more particularly comprises a new and improved grommet for forming a liquid tight seal between the bowl and the refrigerating element.

Beverage dispensers of the general type herein described include a stand on which a refrigerating element is mounted, and a storage bowl that sits on the stand and which has an opening in its bottom through which the refrigerating element extends into the bowl. The bowl is removably supported on the stand so that it may be conveniently cleaned. The grommet employed to form the seal between the bowl opening and the refrigerating element should be easy to clean and mount on the assembly. The ease of assembly is particularly important in multi-beverage dispensers where a single bowl is partitioned into separate compartments each having an opening through which a refrigerating element extends. It will be recognized that in such as assembly, it is particularly advantageous to have the grommet assist in the alignment of the bowl about the separate refrigerating elements.

One important object of this invention is to provide a grommet which will effectively seal the junction between a bowl and a refrigerating element in a beverage dispenser of the type herein described.

Another important object of this invention is to provide a grommet which will assist in the alignment of a bowl on the stand and about the refrigerating element and which has a very low probability of distortion when mounted in place.

Another important object of this invention is to provide a grommet for beverage dispensers which is free of deep crevices so that it may be readily cleaned.

Still another important object of this invention is to provide a grommet for beverage dispensers, which may be manufactured very easily and practically as a molded item by using tooling methods which are relatively inexpensive.

To accomplish these and other objects the grommet of this invention includes an annular body having a plurality of barbs on the inner and outer surfaces with respect to the grommet axis to form a Christmas-tree-like cross section. A flange is formed as an integral part of the body and extends radially inwardly from one end of the Christmas-tree-like configuration. The flange is adapted to lie between the edge of a bowl and the outer surface of the refrigerating element to form a seal between the bowl and element when the parts are assembled.

These and other objects and features of this invention along with its incident advantages will be better understood and appreciated from the following detailed description of one embodiment thereof, selected for purposes of illustration and shown in the accompanying drawing, in which.

Figure 1:
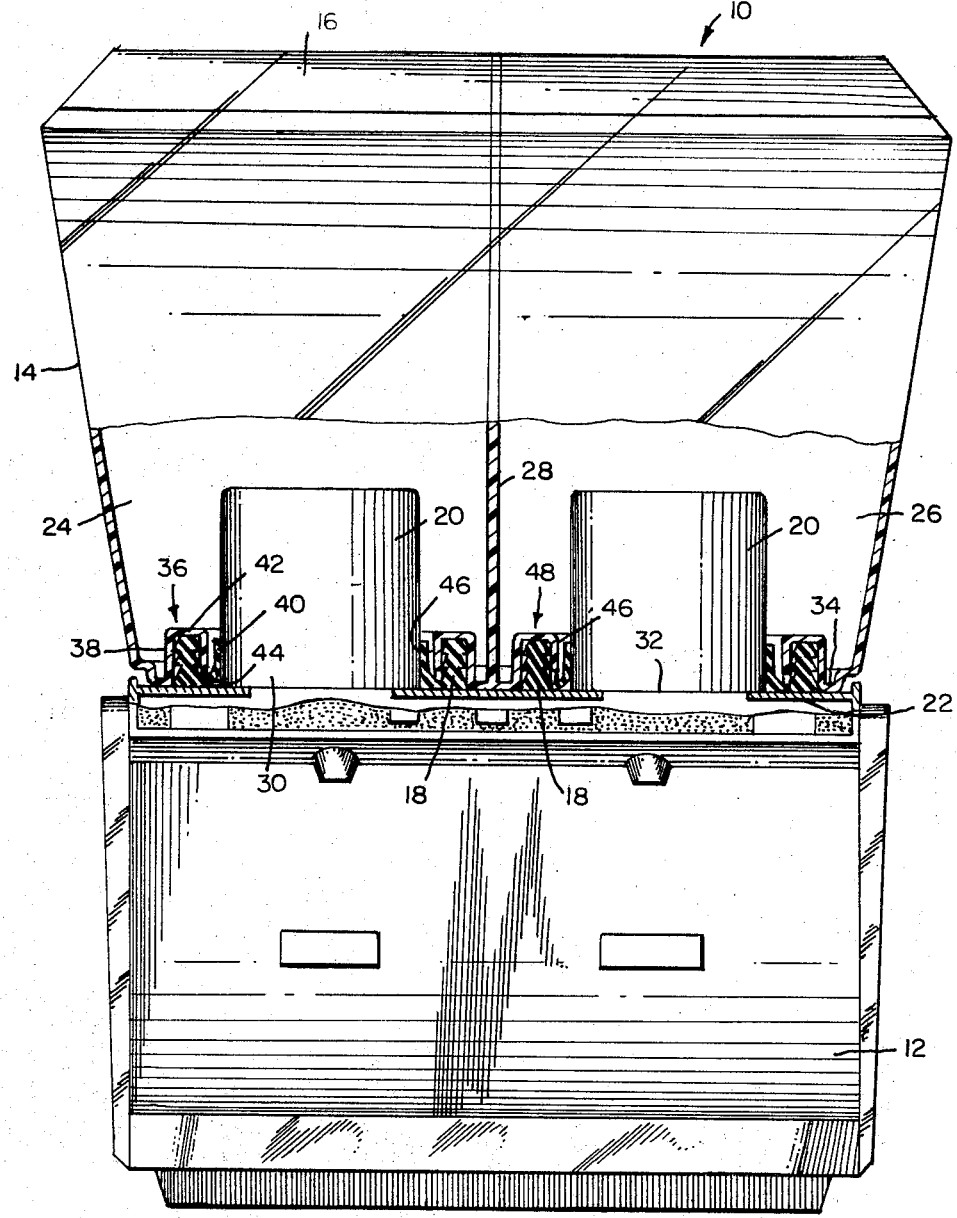
FIG. 1 is a front elevation view, partly in section, of a beverage dispenser embodying two sealing grommets constructed in accordance with this invention.

The beverage dispenser 10 shown in FIG. 1 includes a stand 12, a bowl 14 having a cover 16, and a pair of rubber grommets 18. Disposed within the stand 12 is a refrigerating system (not shown) that directs the refrigerant into the cold domes 20 supported on the upper surface 22 of the stand 12. Each of the domes 20 houses refrigerating coils (not shown) to cool the beverage in the bowl 14. As shown in FIG. 1, the bowl 14 is divided into two compartments 24 and 26 by a partition 28, and one cold dome 20 extends into each compartment.

The bowl 24 which is preferably made of a transparent plastic material is provided with a pair of openings 30 and 32 in its bottom wall 34, one opening being provided in each of the compartments. As is evident in FIGS. 1 and 5, each of the openings is surrounded by a downwardly open channel. The channel 36 surrounding the opening 30 is defined by an outer substantially cylindrical wall 38, an inner substantially cylindrical wall 40 and a top wall 42 that closes the top of the channel. The inner wall 40 is somewhat shorter than the outer wall 38 so that its bottom edge 44 terminates above the plane of the lower surface of the bottom wall 34 of the bowl. The walls 38 and 40 may converge toward one another at a very slight angle to the vertical in an upwardly direction to facilitate insertion of the grommet 18. Typically, the outer wall 38 and the inner wall 40 may each be at an angle of approximately ½° from the vetrical, so that they in turn define an included angle of about 1° from an imaginary point where the two walls intersect.

It is evident in FIG. 1 that the inner surface 46 of the inner wall 40 of the channel 36 actually defines the opening 30 in the bottom wall 34 of the bowl. Similarly, the inner surface of the inner wall of the channel 48 defines the opening 32 in the other compartment 26 of the bowl. An appreciable gap exists between the inner surfaces 46 of the two channels 36 and 48 and their respective cold domes 20 that extend through the openings defined by them. The gaps are in part filled by the grommets 18 as described in detail below.

Figure 2:
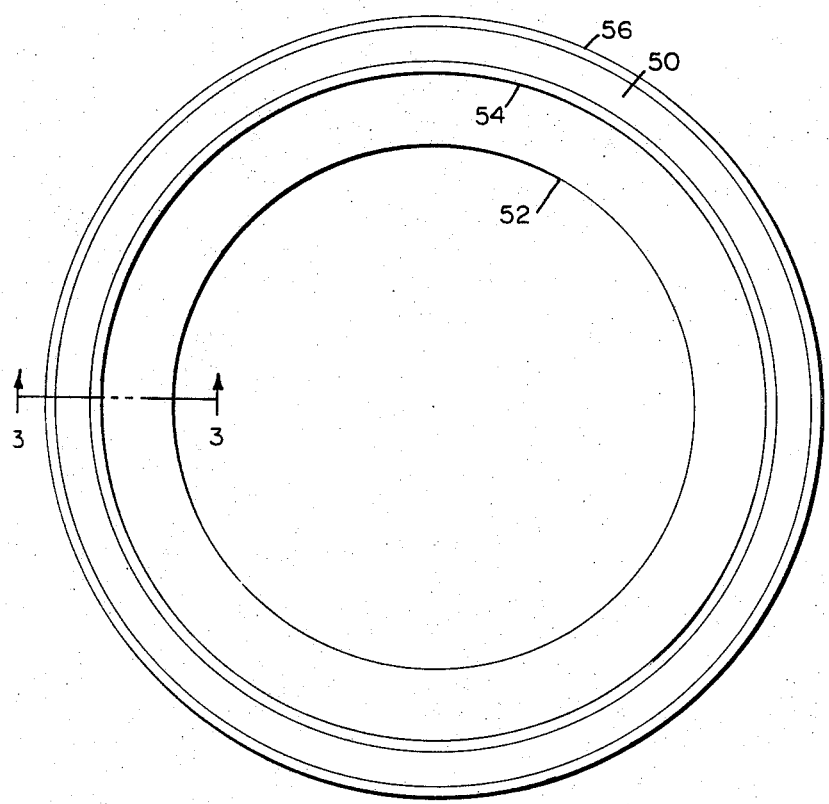
FIG. 2 is a top plan view of one of the grommets shown in FIG. 1.
Figure 4:
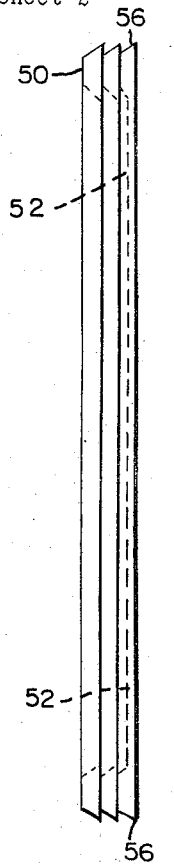
FIG. 4 is a side view of the grommet.
Figure 3:
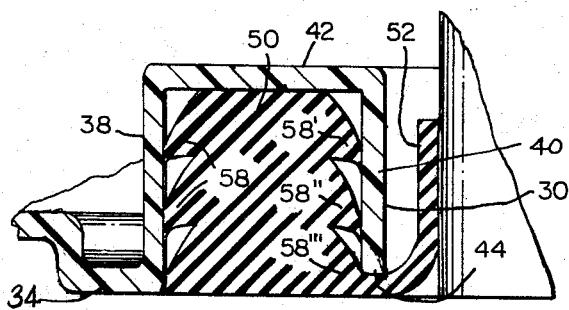
FIG. 3 is an enlarged fragmentary cross-sectional view taken along the section line 3—3 of FIG. 2.

The grommet shown in FIGS. 2–4 includes an annular body portion 50 and an inwardly extending annular flange 52 formed as an integral part of the body. The inner and outer side walls 54 and 56 of the body 50 are barbed as is clearly shown in FIG. 3 so as to give to the body a Christmas-tree-like cross section. The individual barbs 58 are inclined in an upwardly direction as viewed in FIG. 3 so that the body 50 may be inserted upwardly into one of the channels 36 and 48 about the openings 30 and 32. Further, the width of the upper barb 58' may be slightly less than the width of the second barb 58'' so as to give to the body an upwardly directed taper which complements the taper formed in the channel. It will be appreciated that this taper in cooperation with the taper of the side walls of the channel will facilitate insertion of the body into the channel.

The flange 52 is shown to extend radially inwardly from the inner edge of the lowermost barb 58''' formed in the body 50, and when the grommet is assembled in the channel it extends inwardly beyond the surface 46 of the inner wall 40 of the channel 36 that defines the opening 30.

Figure 5:
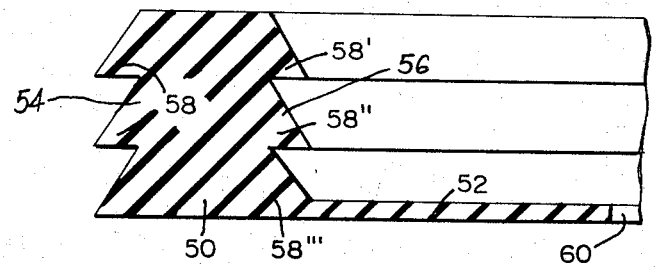
FIG. 5 is an enlarged fragmentary view of the assembly shown in FIG. 1.

A better appreciation may be gained of the grommet if certain typical dimensions are furnished. Typically, the body 50 may have an overall height and width of about ⅜″, and the flange 52 may be somewhat more than ½″ in width. It is important that the flange 52 be of relatively soft rubber so as to form a seal about the cold dome 20 as shown in FIG. 5, and to achieve this flexibility the flange should be approximately .040″ in thickness. Preferably, the gap between the inner surface of the inner wall of the channel and the surface of the dome is approximately twice the thickness of the flange 52, or approximately .080″.

To put together the assembly shown in FIG. 1, the bowl 14 may be inverted, and two grommets of the type shown in FIGS. 2–4 have their bodies 50 inserted into the channels 36 and 48. When the bodies are inserted in the channels, the flanges 52 extend inwardly beyond the lower edges 44 of the inner walls of the channels so as to define an opening within the inner edge 60 of the flanges of somewhat smaller diameter than the diameter of the domes.

It is unnecessary and undesirable to secure the bodies 50 in the channel by cement or any other material for the grommets should be removable for cleaning. After the grommets are mounted in the channels in the manner described, the bowl is turned right side up and is slipped downwardly with the domes 20 extending upwardly within the openings defined by the inner edges 60 of the flanges 52 and the inner surfaces of the inner walls of the channels 36 and 48. The substantial gaps between the outer surfaces of the domes and the inner surfaces of the inner walls of the channels provide adequate room for the flanges 52, and the flanges will turn upwardly in the position shown in FIGS. 1 and 5 as the bowl is lowered over the domes.

When the bowl reaches its lowermost position wherein the lower surface of its bottom wall 34 rests upon the upper surface of the stand 12, the lower surfaces of the bodies 50 of the grommets and the flanges 52 of the grommets form a seal between the bowl, stand and dome which will thereafter prevent any beverage introduced into the compartments from leaking from the tank. When the bowl is to be removed, the beverages in the compartments are of course drained from them, and subsequently the bowl may be lifted off the stand with ease. The gaps between the domes and the channels and the flexible character of the flanges allow the flanges 52 to effectively unroll or peel off the dome walls as the grommets move upwardly with the channel so that the upper surfaces of the flanges 52 engage the outer surfaces of the domes, and the flanges are dragged upwardly below the bowl until the openings are clear of the domes.

From the foregoing description it will be evident that the grommets may be readily cleaned as they lack any deep undercuts or crevices which will tend to collect pulp or other materials which are found in the beverages dispensed by the units. The grommet is easily mounted in and removed from the channel when it is desired to clean the grommet and/or bowl.

The simple grommet configuration enables the grommets to be molded without difficulty, and the molds necessary to form the grommets are not complex. The flange 52 which forms the seal against the outer surface of the cold dome also serves to align the bowl opening with the dome. It will also be appreciated that there is very little opportunity for the flange 52 to distort as the bowl is dropped in place over the dome so that a dependable seal will be formed each time a bowl is mounted in place.

The substantial gap which exists between the cold dome and the channel is particularly desirable in multi-beverage coolers where more than one opening is aligned with the same number of cold domes. The gap provides a substantial clearance and affords a margin to compensate for variations in production. Thus, the grommet and sealing arrangement is particularly suitable for multi-beverage dispensers although they are obviously beneficially used for single beverage dispensers as well.

Those skilled in the art will appreciate that numerous modifications may be made of this invention without departing from its spirit. For example, while the grommet is shown made of one piece of a natural rubber of uniform quality throughout, it may be desirable to make the grommet of other material and/or make the flange of more flexible material than the body.

Another modification may be made in the configuration of the body. While a Christmas-tree-like shape is shown, it will be understood that other shapes may be used. If the body is made of flexible material so that it may be compressed to enable it to be easily inserted into the channels, and if it does not have any deep crevices which would be difficult to clean, and if the body is capable for forming an effective seal in the channel so that the contents of the bowl cannot leak about the body and within the channel, then the principal functions of the body will be realized. The barbs on the body are one means of providing that flexibility, of avoiding deep crevices difficult to clean, and of providing an effective seal between the gasket and the bowl.

Therefore, it is not intended to limit the scope of this invention to the specific embodiment illustrated and described. Rather, it is intended that the scope of this invention be determined by the appended claims and their equivalents.

What is claimed is:

1. In a beverage dispenser,
   a bowl having a bottom wall with a circular edge defining an opening therein,
   a downwardly open annular channel provided in the bottom wall of the bowl about the opening,
   a grommet made of rubber-like material having an annular body disposed in the channel with the body having a plurality of barbs that seal against the side walls of the channel to prevent leakage from the bowl above the body in the channel and to hold the body in the channel,
   a flange forming an integral part of the grommet and extending inwardly from the body and overlapping the edge of the opening,
   and a cooling dome extending upwardly through the opening in the bottom wall of the bowl bending the flange in an upwardly extending position against the outer surface of the dome and forming a seal between the flange and the dome.

2. In the combination defined in claim 1,
   said inner of the side walls of the channel defining the edges of the opening, and said side wall and the outer surface of the dome defining a gap between them substantially equal to twice the thickness of the flange of the grommet and allowing the pressure within the bowl to press the flange against the dome.

3. In the combination defined in claim 2,
   said channel having side walls that converge in an upward direction,
   said barbs extending inwardly and outwardly on the body and extending downwardly from the body, the upper of said barbs being smaller than the lower of said barbs.

4. In a beverage dispenser,
   a bowl having a bottom wall with a circular edge defining an opening therein,
   a downwardly open annular channel provided in the bottom wall of the bowl about the opening and having inner and outer side walls,
   a grommet made of rubber-like material having an annular body removably mounted in the channel,
   a flange forming an integral part of the grommet and extending inwardly from the body and overlapping the edge of the opening with the bottom of the inner side wall bearing against the flange, and a cooling dome extending upwardly through the opening in the bottom wall of the bowl bending the flange in an upwardly extending position against the outer surface of the dome with a gap between the flange and the outside surface of the inner wall enabling the contents of the bowl to press the flange against the dome.

References Cited

UNITED STATES PATENTS

| | | | |
|---|---|---|---|
| 3,112,114 | 11/1963 | Jacobs | 277—205 |
| 3,173,698 | 3/1965 | Haberkorn | 277—209 |
| 3,199,831 | 8/1965 | Sully | 277—208 |
| 3,204,771 | 9/1965 | Baldwin | 277—208 |

THERON E. CONDON, *Primary Examiner.*

E. T. HALL, *Assistant Examiner.*